United States Patent [19]

White

[11] 4,229,916

[45] Oct. 28, 1980

[54] BUILDING PANEL

[76] Inventor: Robert W. White, 37930 Sheffield, Mt. Clemens, Mich. 48043

[21] Appl. No.: 946,948

[22] Filed: Sep. 29, 1978

[51] Int. Cl.$^3$ .................................................. H02G 3/14

[52] U.S. Cl. .......................................... 52/98; 52/518; 174/61

[58] Field of Search ................... 52/28, 220, 199, 518, 52/519-523; 174/48, 61, 63; 362/147

[56] References Cited

U.S. PATENT DOCUMENTS

| | | | |
|---|---|---|---|
| 2,021,929 | 11/1935 | Voigt | 52/521 |
| 3,077,056 | 2/1963 | Albee | 52/518 |
| 3,521,414 | 7/1970 | Malissa | 52/200 |
| 3,708,929 | 1/1973 | Estes | 52/98 |
| 3,906,145 | 9/1975 | Carmichael | 174/48 |

FOREIGN PATENT DOCUMENTS

| | | | |
|---|---|---|---|
| 1509121 | 5/1969 | Fed. Rep. of Germany | 52/200 |
| 2540375 | 3/1977 | Fed. Rep. of Germany | 52/57 |
| 308644 | 3/1929 | United Kingdom | 52/200 |

*Primary Examiner*—John E. Murtagh
*Attorney, Agent, or Firm*—Whittemore, Hulbert & Belknap

[57] ABSTRACT

A building panel having one side complementary to manufactured siding and a flat other side whereby on fastening of the building panel to a structure over manufactured siding the one side of the panel is flush with the manufactured siding while the other side is vertical to permit mounting of a building fixture on the other side of the building panel flush with the building panel and vertically positioned.

6 Claims, 5 Drawing Figures

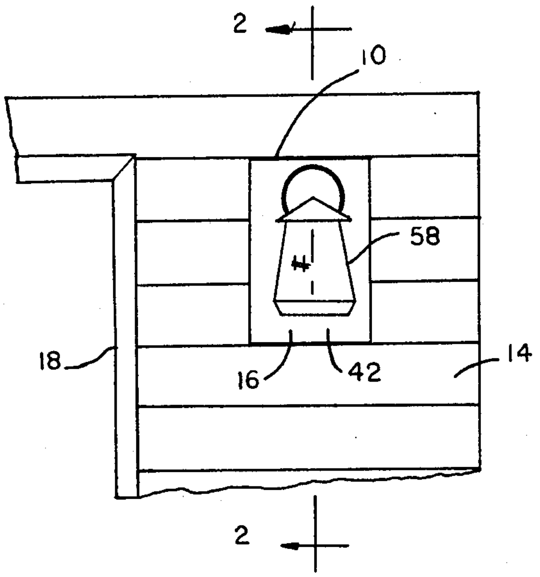
FIG. 1
FIG. 2
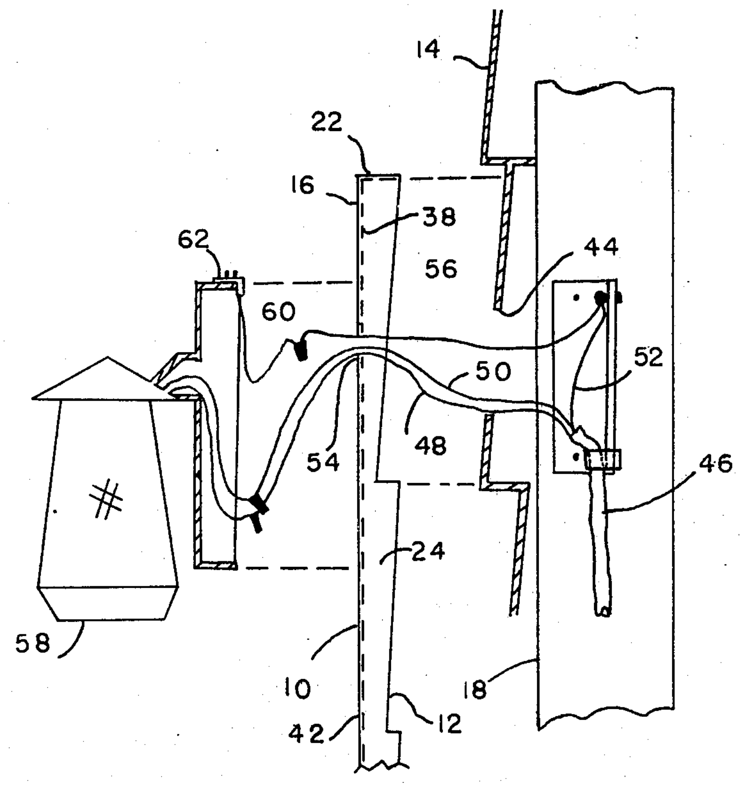

FIG. 3
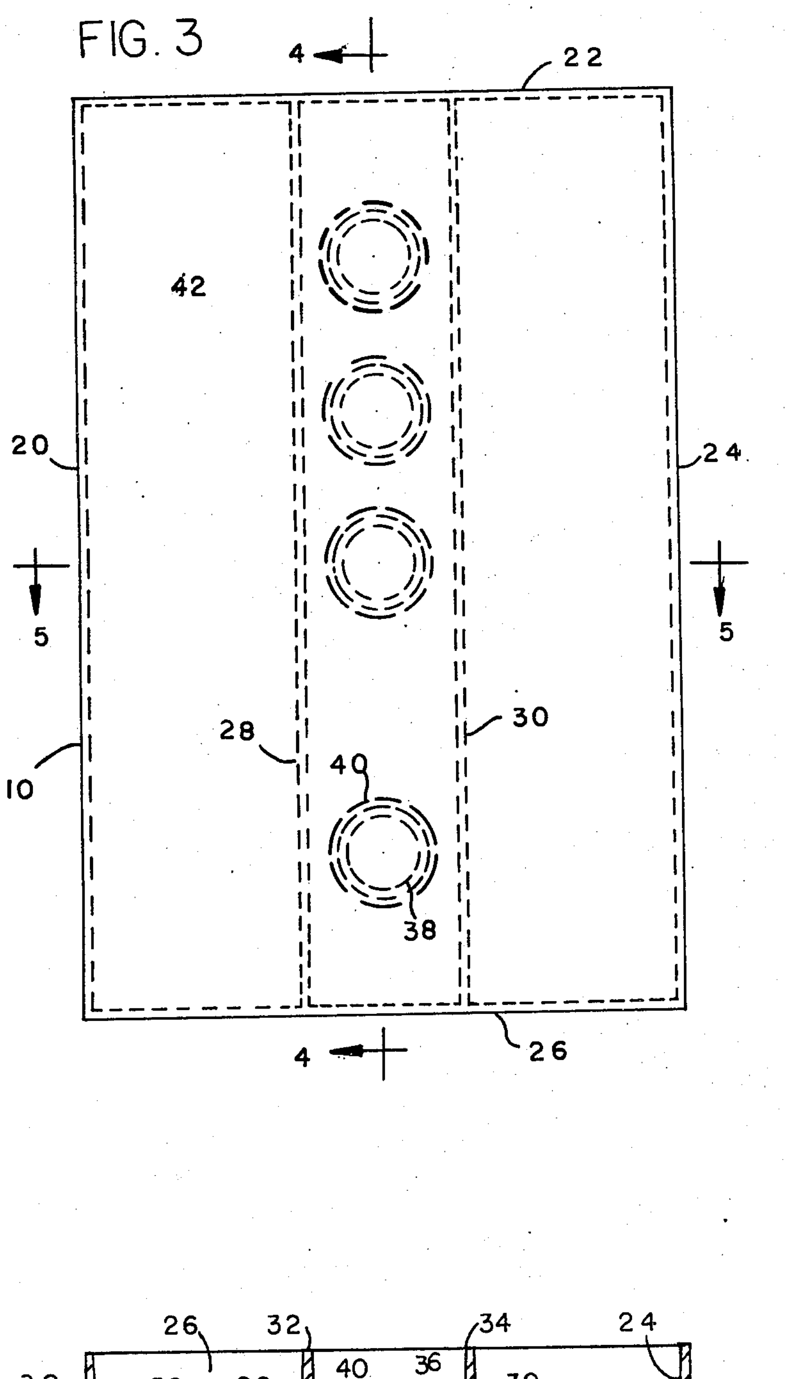
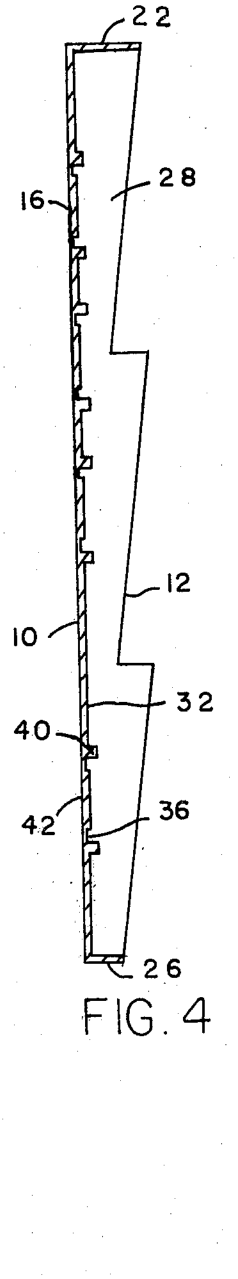
FIG. 4
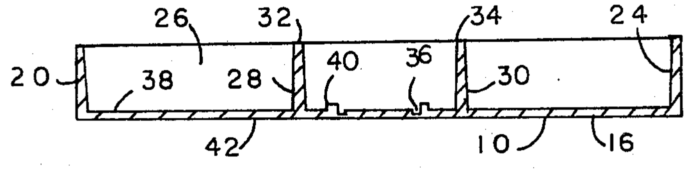
FIG. 5

BUILDING PANEL

BACKGROUND OF THE INVENTION

1. Field of the Invention

The invention relates to building panels and refers more specifically to a building panel for use in conjunction with manufactured siding such as aluminum or vinyl siding constructed to provide a lapped siding appearance wherein the panel has one side constructed to be flush with the building siding with the other side vertical to facilitate vertical flush mounting of a light fixture or the like on the building structure.

2. Description of the Prior Art

In the past, when installing manufactured siding such as aluminum and vinyl siding constructed to provide a lapped siding appearance or even in construction wherein true wood lapped siding has been utilized, the mounting of building fixtures such as light fixtures on the siding has been a problem. Thus, in the past, when the fixtures have been mounted flush with one portion of the lapped siding they have been mounted at an angle to the vertical, and when the fixtures have been mounted vertically large gaps have been left between the flat mounting surface of the fixture and portions of the siding, requiring unsightly caulking or the like.

SUMMARY OF THE INVENTION

The purpose of the present invention is to provide a building panel for use between manufactured siding and a building fixture, one side of which is adapted to mount flush with the building siding and the other side of which is adapted to vertically flush mount the building fixture.

Further, in accordance with the invention, the building panel may be a plastic injection molding having reinforcing therein and means for facilitating making openings therethrough at selected locations to permit placing portions of building fixture connections such as light fixture wiring therethrough.

BRIEF DESCRIPTION OF THE DRAWINGS

FIG. 1 is an elevation view of a portion of a building structure including a light fixture secured to manufactured siding thereon with a building panel constructed in accordance with the invention positioned between the light fixture and manufactured siding.

FIG. 2 is an exploded partial section view of the building structure light fixture and building panel illustrated in FIG. 1, taken substantially on the line 2—2 in FIG. 1.

FIG. 3 is an elevation view of a building panel constructed in accordance with the invention.

FIG. 4 is a section view of the building panel illustrated in FIG. 3, taken substantially on the line 4—4 in FIG. 3.

FIG. 5 is a section view of the building panel illustrated in FIG. 3, taken substantially on the line 5—5 in FIG. 3.

DESCRIPTION OF THE PREFERRED EMBODIMENT

The building panel 10 of the invention is best shown in FIGS. 3–5. As shown in FIGS. 3–5, the building panel 10 is an injection molded plastic panel of any suitable material such as polyvinyl chloride. As shown, the panel 10 has one side 12 which is formed complementary to the aluminum siding 14 shown in FIG. 2 whereby the panel 10 will fit flush against the aluminum siding 14 in installation. The other side 16 of the building panel 10 is constructed to be vertical with the panel 10 in installation on the aluminum siding 14 of the building structure 18.

The building panel 10, as shown in FIGS. 3–5, further includes the flanges 20, 22, 24 and 26 extending perpendicularly from the side 16 thereof, the outer edges of which form the side 12 of the building panel. Internal ribs 28 and 30 extend parallel to the flanges 20 and 24 as shown in FIG. 3 to provide reinforcing for the building panel 10 in installation. The edges 32 and 34 of the ribs 28 and 30 are formed similar to the edges of the flanges 20 and 24 to fit flush with the siding 14.

As shown in FIGS. 3–5, annular grooves 36 are provided at vertically spaced apart locations on the inner surface 38 of the side 16 of the building panel 10. The annular grooves 36 are surrounded by annular ridges 40 as shown best in FIGS. 4 and 5. In use, the annular grooves 36 in conjunction with the annular ridges 40 permit ready removal of a circular portion of the building panel to permit wiring or portions of a building fixture to extend therethrough as desired. Before removal, the annular grooves 36 and ridges 40 are not visible from the outer surface 42 of the side 16 of the building panel 10.

In use, a building structure 18 such as a house is constructed and aluminum or vinyl siding 14 having a configuration to resemble lapped wood siding is secured to the building structure. An opening 44 may be made in the siding to permit wiring from a romex three-wire wiring system 46, including conductors 48 and 50 and a separate ground connection 52 to pass therethrough. The conductors are passed through the opening 44 in the aluminum siding, as shown best in FIG. 2.

The panel 10 with a desired opening 54 made therein and facilitated by annular grooves 36 and ridges 40 is then secured to the building structure 18 over the aluminum siding 14 by convenient means such as nails. The conductors 48 and 50 and ground connector 56 are passed through the opening 54 in the building panel 10 and the light fixture 58 is secured to the vertical side 16 of the building panel 10 flush with the building panel 10 after the conductors 48 and 50 are connected thereto and the ground conductor 60 is secured to the light fixture 58 by means of the grounded clamp 62 as shown in FIG. 2.

So installed, the light fixture 58 will be vertical. Further, the panel 10 will be flush with the aluminum siding 14 and the light fixture 58 will be flush with the panel 10, requiring little or no caulking.

While one embodiment of the present invention has been considered in detail, it will be understood that other embodiments and modifications thereof are contemplated by the inventor. It is the intention to include all embodiments and modifications as are defined by the appended claims within the scope of the invention.

What I claim as my invention is:

1. A building panel for use in conjunction with manufactured siding such as aluminum and vinyl siding which is constructed to provide a surface having a lapped siding appearance, said building panel having substantial dimensions in two mutually perpendicular directions parallel to the sides thereof, said building panel being rectangular and having a top edge, a bottom edge and two side edges, flanges extending in the same direction from one side thereof perpendicular to the building panel at the top, bottom and side edges thereof, a pair of reinforcing ribs extending in the same direction from the one side thereof perpendicular to the building panel between the top and bottom flanges substantially centrally of the building panel, said flanges and reinforcing ribs terminating in surfaces having a configuration complementary to the configuration of the manufactured siding so as to fit flush against the installed manufactured siding, said building panel having a flat surface on the side thereof opposite the flanges and reinforcing ribs which is vertical with the building panel installed to facilitate vertical mounting of a fixture on a building structure, three spaced apart annular grooves in the surface of the one side of the building panel on the upper two-thirds thereof surrounded by annular ridges on the surface of one side of the building panel and one annular groove in the surface of the lower one-third of the one side of the building panel surrounded by an annular ridge whereby the other side of the building panel is flat and openings may be readily effected at different locations vertically thereof to facilitate connecting of the fixture on the building panel.

2. In combination, building structure, siding on the building structure having a surface with a lapped siding appearance presenting alternate horizontal and vertically inclined flat surface portions, a plastic building panel having substantial dimensions in mutually perpendicular directions substantially parallel to the siding secured over a portion of the siding, said building panel having flanges extending perpendicular to one side thereof which terminate in surfaces complementary to the surface of the siding and reinforcing ribs in the panel also extending perpendicular to the one side thereof and terminating in surfaces complementary to the surface of the siding, said complementary surfaces of the flanges and reinforcing ribs being in engagement with the surface of the siding, the other side of the building panel having a vertical surface with the complementary surfaces of the flanges and ribs in engagement with the surface of the siding, a building fixture secured to the vertical surface of the building panel and a plurality of vertically spaced apart annular grooves in the surface of the one side of the building panel surrounded by annular ridges on the surface of the one side of the building panel whereby openings may be readily effected in the building panel to facilitate mounting and connecting of the fixture on the building panel.

3. Structure as set forth in claim 2 wherein the siding has an opening therethrough over which the building panel is positioned and the building panel has an opening therethrough aligned with the opening in the siding over which the fixture which is a light fixture is secured, electric wires running from the building structure to the light fixture through the holes in the siding and building panel and a separate ground connection to the light fixture in the building structure through the holes.

4. A plastic building panel for use in conjunction with manufactured siding such as aluminum and vinyl siding which is constructed to provide a lapped siding appearance, said building panel having substantial dimentions in two mutually perpendicular directions parallel to the sides thereof and a configuration on one side thereof complementary to the configuration of the manufactured siding so as to fit flush against the installed manufactured siding and having a flat surface on the other side thereof which is vertical with the building panel installed to facilitate vertical mounting of a fixture on a building structure, the building panel being a plastic panel having flanges extending perpendicular to said other side of the panel which terminate in surfaces complementary to the surface of the siding defining the one side of the siding and reinforcing ribs in the panel extending perpendicular to said other side of the siding which terminate in surfaces complementary to the surface of the siding.

5. A plastic building panel for use in conjunction with manufactured siding such as aluminum and vinyl siding which is constructed to provide a lapped siding appearance, said building panel having substantial dimensions in two mutually perpendicular directions parallel to the sides thereof and a configuration on one side thereof complementary to the configuration of the manufactured siding so as to fit flush against the installed manufactured siding and having a flat surface on the other side thereof which is vertical with the building panel installed to facilitate vertical mounting of a fixture on a building structure and a plurality of vertically spaced apart annular grooves in the surface of the one side of the building panel surrounded by annular ridges on the surface of the one side of the building panel whereby openings may be readily effected in the building panel to facilitate mounting and connecting of the fixture on the building panel.

6. A building panel for use in conjunction with manufactured siding such as aluminum and vinyl siding which is constructed to provide a surface having a lapped siding appearance, said building panel having substantial dimensions in two mutually perpendicular directions parallel to the sides thereof, said building panel being rectangular and having a top edge, a bottom edge and two side edges, flanges extending in the same direction from one side thereof perpendicular to the building panel at the top, bottom and side edges thereof, a pair of reinforcing ribs extending in the same direction from the one side thereof perpendicular to the building panel between the top and bottom flanges substantially centrally of the building panel, said flanges and reinforcing ribs terminating in surfaces having a configuration complementary to the configuration of the manufactured siding so as to fit flush against the installed manufactured siding, said building panel having a flat surface on the side thereof opposite the flanges and reinforcing ribs which is vertical with the building panel installed to facilitate vertical mounting of a fixture on a building structure and means in the surface of the one side of the bulding panel to facilitate making an opening therethrough whereby a fixture on the building panel may be readily connected to an electrical circuit.

* * * * *